(12) United States Patent
Mills

(10) Patent No.: US 7,389,959 B2
(45) Date of Patent: Jun. 24, 2008

(54) MODULAR OVERHEAD PRIVACY SYSTEM AND METHOD

(75) Inventor: Christopher J Mills, Everett, WA (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 10/949,431

(22) Filed: Sep. 24, 2004

(65) Prior Publication Data

US 2005/0178909 A1 Aug. 18, 2005

Related U.S. Application Data

(63) Continuation-in-part of application No. 10/759,464, filed on Jan. 19, 2004, now Pat. No. 6,932,298.

(51) Int. Cl.
*B64D 11/00* (2006.01)

(52) U.S. Cl. .................. 244/118.5; 244/118.6; 105/315; 105/316; 114/192

(58) Field of Classification Search .............. 244/118.5, 244/118.6; 105/314, 315, 316; 114/192
See application file for complete search history.

(56) References Cited

U.S. PATENT DOCUMENTS

| | | | | |
|---|---|---|---|---|
| 4,066,227 | A | 1/1978 | Buchsel | 244/118 P |
| 4,686,908 | A | 8/1987 | Legrand | |
| 5,115,999 | A | 5/1992 | Buchsel et al. | 244/118.5 |
| 5,314,143 | A | 5/1994 | Luria | 244/118.1 |
| 5,784,836 | A | 7/1998 | Ehrick | 52/79.8 |
| 6,056,239 | A | 5/2000 | Cantu et al. | |
| 6,073,883 | A | 6/2000 | Ohlmann et al. | 244/118.5 |
| 6,182,926 | B1 | 2/2001 | Moore | |
| 6,305,645 | B1 | 10/2001 | Moore | |
| 6,464,169 | B1 | 10/2002 | Johnson et al. | |
| 6,520,451 | B1 | 2/2003 | Moore | |
| 6,581,876 | B2 | 6/2003 | Cheung | |
| 6,616,098 | B2 | 9/2003 | Mills | |
| 6,659,225 | B2 | 12/2003 | Olliges et al. | |
| 6,851,134 | B2 * | 2/2005 | Freller | 5/9.1 |

* cited by examiner

*Primary Examiner*—J. Woodrow Eldred
(74) *Attorney, Agent, or Firm*—Harness, Dickey & Pierce, P.L.C.

(57) ABSTRACT

A modular overhead privacy system for a mobile platform, in one form, includes a plurality of independent privacy modules located longitudinally spaced apart, above a passenger cabin, in an overhead crown area of the mobile platform. The system additionally includes a plurality of private access stairways providing access to the privacy modules from the passenger cabin. Each private module is accessible by an independent one of the private access stairways. Each privacy module includes at least one berth that provides a passenger or crew member a private reposing space separate from the passenger cabin. In one embodiment the privacy modules are longitudinally spaced apart in accordance with a seat pitch of a plurality of rows of seats in the passenger cabin. In another embodiment the seats are positioned adjacent one another behind a stairway leading the overhead privacy module. The system can be employed in either a passenger cabin area or a crew member area of a mobile platform.

14 Claims, 7 Drawing Sheets

MODULAR OVERHEAD PRIVACY SYSTEM AND METHOD

CROSS-REFERENCE TO RELATED APPLICATIONS

This application is a continuation-in-part of U.S. patent application Ser. No. 10/759,464 filed on Jan. 19, 2004 now U.S. Pat. No. 6,932,298, the disclosure of which is incorporated herein by reference.

FIELD OF INVENTION

The invention relates generally to privacy quarters for passengers and crew members of a mobile platform. More specifically the invention relates to a modular overhead privacy system that provides a plurality of independent overhead privacy modules for use by passengers or crew members that makes efficient overhead use of space within the mobile platform.

BACKGROUND OF THE INVENTION

Passenger mobile platforms, such as aircraft, buses and trains often travel long distances and many hours without stopping. As hours pass, this can sometimes place passengers and/or crew members under stress and discomfort. To address this, many mobile platforms have attempted to provide a measure of comfort by providing seats with additional padding and extended angles of reclination, and ample room for body movement without disturbing other passengers. However, these known methods of addressing passenger and/or crew member comfort and rest only minimally reduce such discomfort, and often do not provide the privacy and additional sufficient, private space needed to relax passengers and/or crew members.

Furthermore, when individuals are traveling within a mobile platform for an extended period of time, an individual may need some place to go, i.e. an area within the mobile platform itself away from his/her seat or work area for periods of uninterrupted rest. To address this need of passengers and/or crew for a separate, private space, away from their seat or work area, some mobile platforms have incorporated lounges within the passenger cabin. In other instances sleeping berths have been provided in an overhead area above the passenger cabin. However, both of these known methods typically require the area of many seats and therefore consume a considerable amount of the seating capacity within the passenger cabin. Additionally, known overhead resting accommodations for passengers typically include a single overhead structure having a plurality of berths accessible from a single aisle extending the entire longitudinal length of the overhead structure. These known overhead resting structures are generally only accessible by a single stairway at one end of the aisle or by a pair of stairways located at the aft and forward ends of the aisle. This, at best, provides only minimal privacy as each passenger must traverse the aisle, passing by other berths which may be occupied, to reach an unoccupied berth.

Therefore, it would be desirable to provide passengers and/or crew members traveling for extended periods on a mobile platform with private resting quarters that provide sufficient room to comfortably repose, that can be utilized without interfering with other needed space on the mobile platform or the loss of seating capacity in the passenger cabin.

BRIEF SUMMARY OF THE INVENTION

In one preferred embodiment of the present invention, a modular overhead privacy system for a mobile platform is provided. The modular overhead privacy system includes a plurality of independent individual privacy modules located longitudinally spaced apart, in an overhead area of a cabin of the mobile platform. In one form the modular overhead privacy system additionally includes a plurality of private access stairways providing access to the privacy modules from a passenger cabin area. Each private module is accessible by an independent one of the private access stairways. Each privacy module includes at least one berth that provides a passenger a private reposing space separate from the passenger cabin. Additionally, each privacy module is associated with at least one specific seat in the passenger cabin preferably located near a bottom portion of the respective access stairway. The privacy modules are longitudinally spaced apart in accordance with a seat pitch of a plurality of rows of seats in the passenger cabin. Therefore, each access stairway descends from the respective privacy module such that a bottom portion of the access stairway encroaches on only a single seat location within a specific row of seats. Spacing the privacy module in accordance with the seat pitch also positions each access stairway such that an upper portion of the access stairway provides ample passenger access to the row of seats behind the row of seats associated with the bottom portion of the stairway.

In an alternative preferred embodiment, an overhead crew rest module is provided that is well adapted for use by crew members on a mobile platform. The overhead crew rest is especially well suited for applications on commercial aircraft. The overhead crew rest provides both seating and reposing areas for crew members in a highly space efficient configuration that makes maximum use of available overhead space at the forward or aft areas of a mobile platform, as well as at a flight deck area of a mobile platform.

The features, functions, and advantages can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE PREFERRED EMBODIMENTS

The following description of the preferred embodiments is merely exemplary in nature and is in no way intended to limit the invention, its application or uses.

Figure 1:
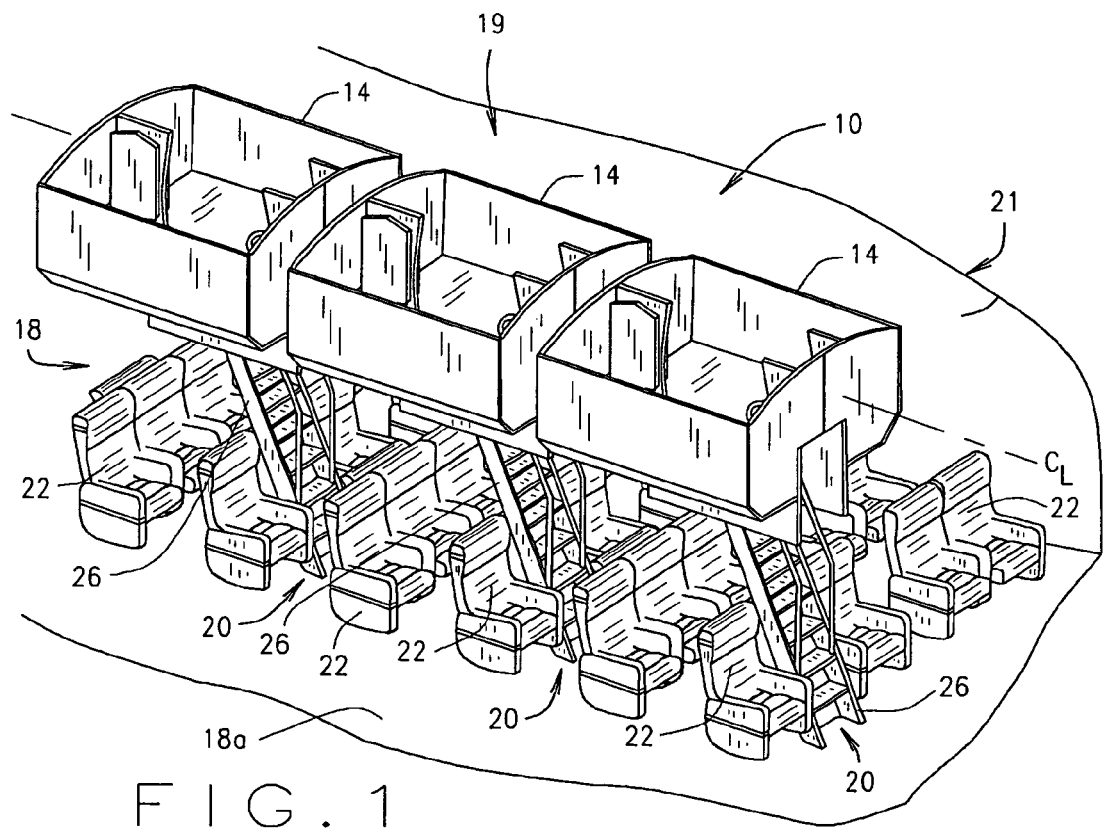
FIG. 1 is an isometric view of a modular overhead privacy system for a mobile platform in accordance with a preferred embodiment of the present invention.

FIG. 1 illustrates a modular overhead passenger privacy system 10 in accordance with a preferred embodiment of the present invention. System 10 includes a plurality of independent passenger privacy modules 14. The passenger privacy modules 14 are longitudinally spaced apart above a passenger cabin 18 in an overhead crown area 19 of a mobile platform 21. Each privacy module 14 is associated with one or more seats 22 in the passenger cabin 18 and encroaches only on a single seating location 20. In one preferred implementation, the privacy system 10 is centered within the overhead crown area 19 such that a longitudinal axis of the privacy system 10 aligns with a longitudinal centerline $C_L$ of the mobile platform 21. Thus, the privacy modules 14 are longitudinally spaced apart along the longitudinal center line $_L$.

Although FIG. 1 illustrates the seats 22 arranged such that each row of seats 22 includes a group of two seats 22 and a separate group of three seats 22 separated by a passenger aisle 24, it should be understood that with the specific implementation of FIG. 1, a third group of seats 22 in each row of seats 22 and a second passenger aisle 24 would typically exist, but have not been shown in FIG. 1. Thus, FIG. 1 illustrates a partial view of what is commonly known as a 2-3-2 seating configuration, with the third group of two seats 22 and the second passenger aisle 24 not shown.

Overhead passenger privacy system 10 can be employed in any mobile platform having suitable room in an overhead area and a suitable seating configuration. For example, the privacy system 10 is compatible for employment in mobile platforms having what is commonly known as a 3-3-3, a 2-5-2 or a 2-5-3 seating configuration. In each case the privacy system 10 may be aligned with a longitudinal centerline CL of a cabin area of the mobile platform, or possibly even offset from the centerline, overhead space permitting.

The modular overhead passenger privacy system 10 further includes a plurality of access stairways 26 that provide access to the privacy modules 14 from the passenger cabin 18. Each privacy module 14 is accessible by a separate and independent one of the access stairways 26. As described above, each privacy module 14 encroaches on the area of only a single seating location 20. More specifically, the access stairway 26 for each privacy module 14 encroaches only on a single seating location 20 located along the center line $C_L$. As illustrated in FIG. 1, not all rows of seats 22 have a seating location 20 that is encroached on by an access stairway 26. Thus, only a single seating location 20 along the center line $C_L$ in specific rows of seats 22 is encroached on by the access stairways 26. Therefore, each privacy module 14 is only accessible from a specific row of seats 22 in cabin 18. In a preferred embodiment, each privacy module 14 is associated with at least one specific seat 22, and preferably a group of seats 22, located near the respective access stairway 26 of each privacy module 14. Thus, only one seating position 20 would be encroached upon and that seating position 20 would be the seating position aligned with the centerline $C_L$ of the fuselage of the mobile platform 21.

Figure 2:
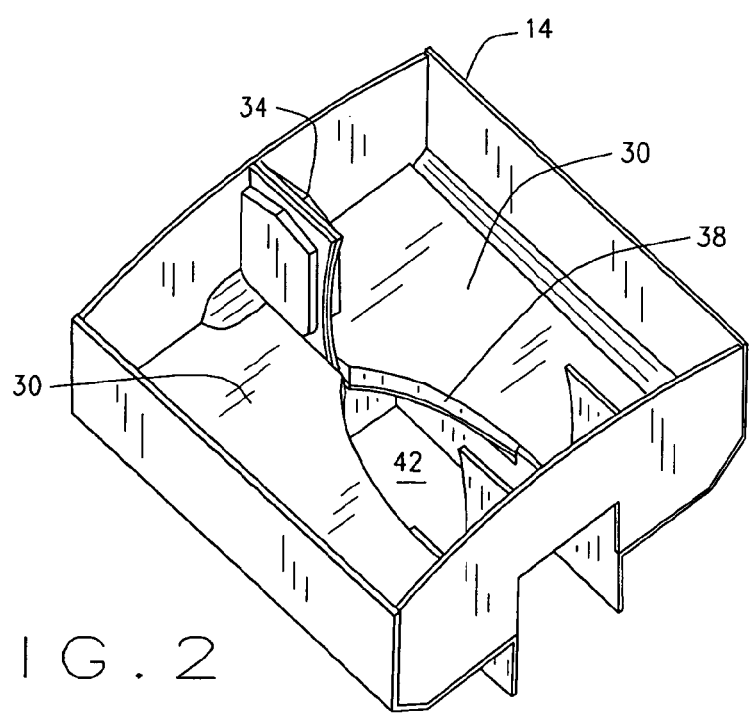
FIG. 2 is an isometric top view of a privacy module included in the modular overhead privacy system shown in FIG. 1.

FIG. 2 is an isometric top view of one of the privacy modules 14 included in the modular overhead privacy system 10 shown in FIG. 1. Each privacy module 14 includes at least one berth 30, and more preferably two berths 30, as illustrated in FIG. 2. The berths 30 are separated by a partition 34 and a stairway access aperture 38. Aperture 30 leads to a non-traversing platform 42 associated with an upper portion of each access stairway 26. Each berth 30 is suitably sized to provide comfortable spacing for a passenger to repose within the berth 30. Each berth 30 also provides sufficient space so that a passenger can comfortably recline within the berth 30. This space is preferably on the order of approx 40 inches wide×82 inches long×40 inches high (208 cm-101 cm). The non-traversing platform 42 is adapted to allow a passenger to stand at least somewhat erect within a related privacy module 14 and/or to sit on the edge of the berth 30 and rest their feet on the platform 42. The non-traversing platform 42 preferably is at least about 70 inches (177.8 cm) above the floor 18a of the mobile platform 21. The distance from the platform 42 to the ceiling or crown 18b of the mobile platform 21 is approximately 65 (165 cm) inches. This allows for easy ingress/egress relative to the seats 22 located along the centerline $C_L$ of the fuselage of the mobile platform 21. More specifically, the non-traversing platform 42 is adapted to allow a passenger to freely and comfortably navigate himself/herself from the access stairway 26 to his/her assigned berth 30.

As shown in FIG. 2, privacy module 14 does not have a center aisle. This allows each berth 30 within the privacy module to have additional width. The overall width of privacy module 14 may vary depending on the size of the mobile platform and other factors, but is preferably between about 38 inches-42 inches (96.52 cm-106.68 cm). This, in combination with the independent spaced apart privacy modules 14, also eliminates the disruptions to a passenger in a berth 30 caused by passengers traversing a common aisle, as is common in known crew and passenger rest systems.

In an alternative preferred embodiment, each berth 30 includes an entertainment and amenity system accessible for use by a passenger utilizing a privacy module 14. The entertainment and amenity system can includes such things as audio and video devices, internet access ports, security cameras, individual temperature control, alarm clock and intercom.

Figure 3:
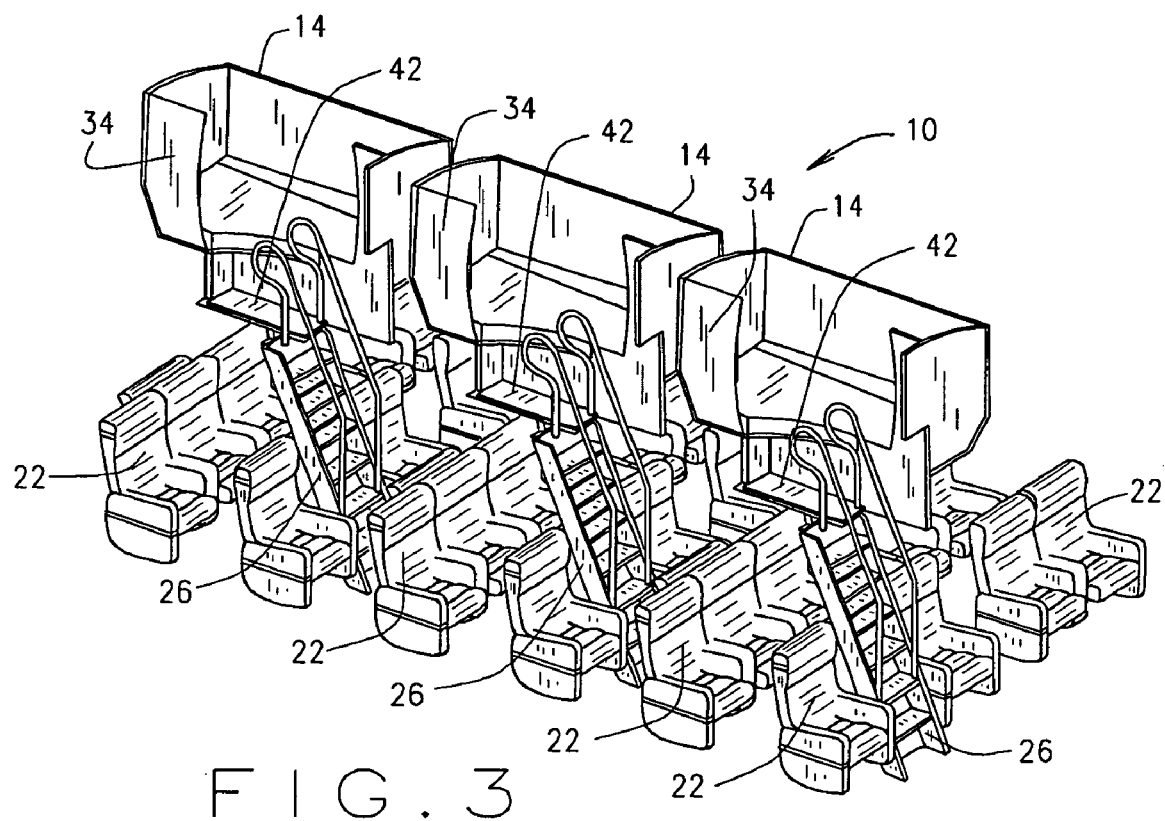
FIG. 3 is a sectional view of the modular overhead privacy system shown in FIG. 1.

FIG. 3 is a sectional view of the modular overhead privacy system 10 shown in FIG. 1. As seen in FIG. 3, each platform 42 is associated with an upper portion of a related access stairway 26. As described above, and now illustrated in FIG. 3, each privacy module 14 is associated with at least one seat 22 in the passenger cabin 18. More specifically, a bottom portion of each access stairway 26 is associated with, i.e. located next to or near, at least one seat 22. Furthermore, each access stairway 26 encroaches on a single seat position in a specific row of seats 22 within the passenger cabin 18. Thus, a specific row of seats 22 is spatially connected to each privacy module 14.

It is envisioned that the seat or seats 22 associated with each privacy module 14 will be assigned to the passenger(s) assigned access to the associated privacy module 14. In a preferred embodiment, there is a single seat 22 associated with each berth 30. The assignment of the associated seats 22 to the passenger(s) assigned access to each privacy module 14 will provide such passenger(s) with a sense of centrality or unity of spaces. That is, such passengers will feel their private space is connected to their public space. This provides the passenger with a soothing psychological sense of spatial ownership, also referred to as "nesting". For example, when a passenger of the mobile platform 21 sits in a seat 22 for an extended period of time the passenger tends to become acclimated to that particular space within the passenger cabin 18. That is, the passenger brings their possessions, such as magazines, laptop computers and carry on luggage to that space and tends gain a sense of ownership of that space, i.e. 'nest' in that space. Due to the close, and preferably unobstructed, proximity of the access stairways 26 to the associated seat(s) 22, the privacy modules 14 provide a psychological extension from the passenger's seat 22 to the berth 30. Therefore, there is not only a physical link between the passenger's seating space and the space in the associated privacy module 14, but also a psychological continuity between the seating space and the space of the associated berth 30.

As further illustrated in FIGS. 1 and 2, the independent privacy modules 14 are spaced apart and not coupled to each other. Each privacy module 14 is independently connected to structural framework of a fuselage of the mobile platform. This allows the privacy modules 14 to be spaced apart in accordance with a seat pitch of the specific mobile platform. More specifically, the distance between each privacy module 14 is associated with the distance between each row of seats 22. Thus, the privacy modules 14 are spaced closer or further apart depending on the space, i.e. pitch, between rows of seats 22. In a preferred embodiment, where the seat pitch is larger, each privacy module 14 only encroaches on a seating position in the row of seats 22 associated with the bottom portion of each access stairway 26 without encroaching on any seats 22 in the row of seats 22 behind the associated row. That is, spacing the privacy modules 14 in accordance with the seat pitch allows each access stairway 26 to connect the associated seat(s) 22 with the related privacy module 14 without encroaching on the row of seats 22 behind the associated row of seats 22. More specifically, the privacy modules 14 are spaced apart such that the upper portion of each access stairway 26 is located to provide ample access to a row of seats 22 behind the row of seats 22 encroached upon by the bottom portion of each access stairway 26. Thus, the bottom portion of each access stairway 26 is associated with a row of seats 22 and encroaches on one seating position within that row, while the upper portion of each access stairway is located such that there is ample access to the row of seats behind the encroached on row of seats. In an alternate preferred embodiment, where the seat pitch is less, each privacy module 14 encroaches on one seating position in the row of seats 22 associated with the bottom portion of each access stairway 26 and one seating position in the row of seats 22 behind the associated seats 22. However, it will be appreciated that in this embodiment, only two rows of seats 22 have a seating position encroached on by each access stairway 26 and that not all the rows of seats 22 in the mobile platform have seating positions encroached on by an access stairway 26.

Furthermore the spacing apart of each independent privacy module 14 allows for aircraft infrastructure, e.g. environmental control system ducts, electrical wiring, other sorts of conduit, to pass between each privacy module 14 and laterally traverse the mobile platform 21 from one side to the other.

Figure 4:
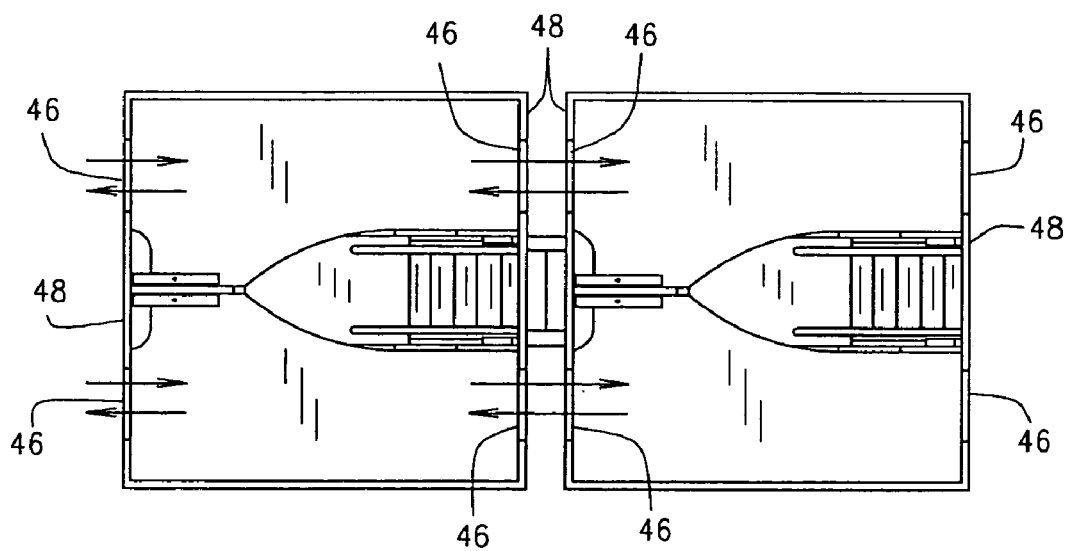
FIG. 4 is top view of a pair of privacy modules illustrating an emergency access included in each privacy module.

FIG. 4 is a top view of a pair of privacy modules 14 illustrating at least one emergency gateway 46. The emergency gateway 46 is included in at least one end wall 48 of each privacy module 14. Regulations may require that there always be an alternate egress route for any kind of enclosed space in a mobile platform. Therefore, an alternate egress route for each privacy module 14 is provided by the emergency gateway 46, in case the access stairway 26 of the module 14 becomes unusable. Each emergency gateway 46 is adapted to allow passengers reposing in the privacy modules 14 to exit each privacy module 14 and enter a longitudinally adjacent privacy module 14 without entering the passenger cabin 18. Therefore, in case of an emergency where the independent private access stairway 26 to any of the privacy modules 14 is blocked, a passenger in such a privacy module 14 can escape to a longitudinally adjacent privacy module 14 via the access gateway 46. Each emergency gateway 46 includes a removable barrier mechanism suitable to block the emergency gateway 46 when emergency egress from the privacy module is not needed, but easily removable when emergency egress is needed. For example, the removable barrier mechanism can be a blow out panel or hinged door or locking door.

Figure 5:
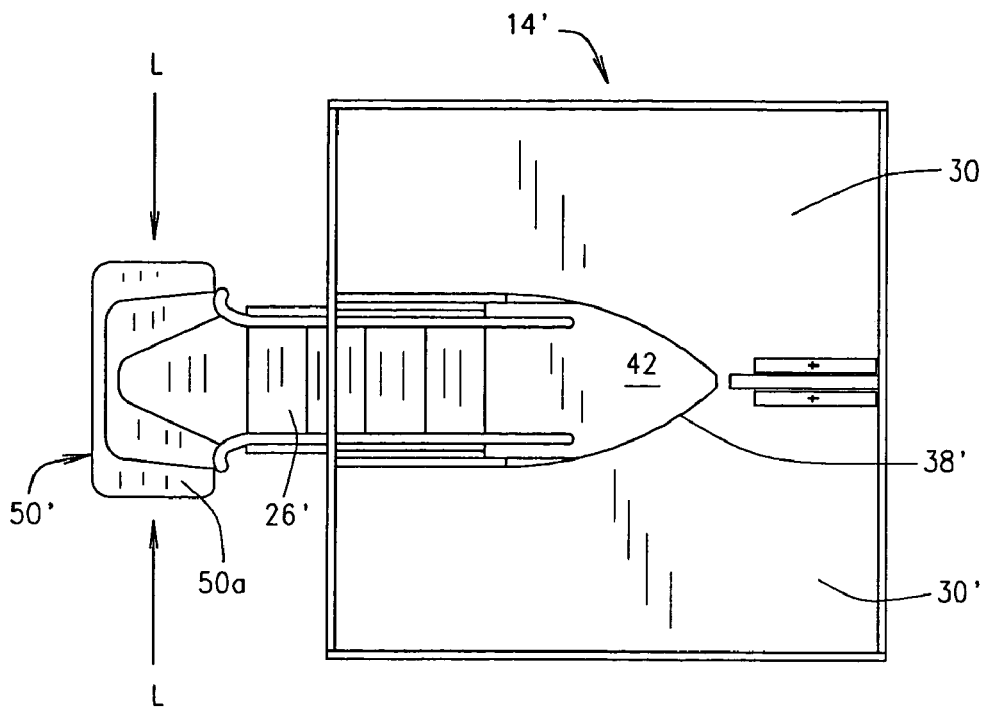
FIG. 5 is a top view of a privacy module illustrating an alternate preferred embodiment of a private access stairway shown in FIG. 1.

FIG. 5 is a top view of a privacy module 14' illustrating an alternate preferred embodiment of the privacy access stairway 26'. As illustrated in FIG. 5, each private access stairway 26' lead into the berths 30' of the privacy module 14' via aperture 38'. In a preferred alternate embodiment, the bottom portion of each access stairway 26' includes a platform portion 50'. The platform 50' includes at least one laterally, or sideward, facing step 50a adapted to provide access to each access stairway 26' from a lateral direction L. Platform 50' provides a smaller footprint for each access stairway 26' so that each access stairway 26' consumes less area in the passenger cabin 18. More specifically, the smaller footprint provides even more space and access to the row of seats 22 behind the row of seats associated with the bottom portion of each access stairway 26'.

Figures 6A, 6B:
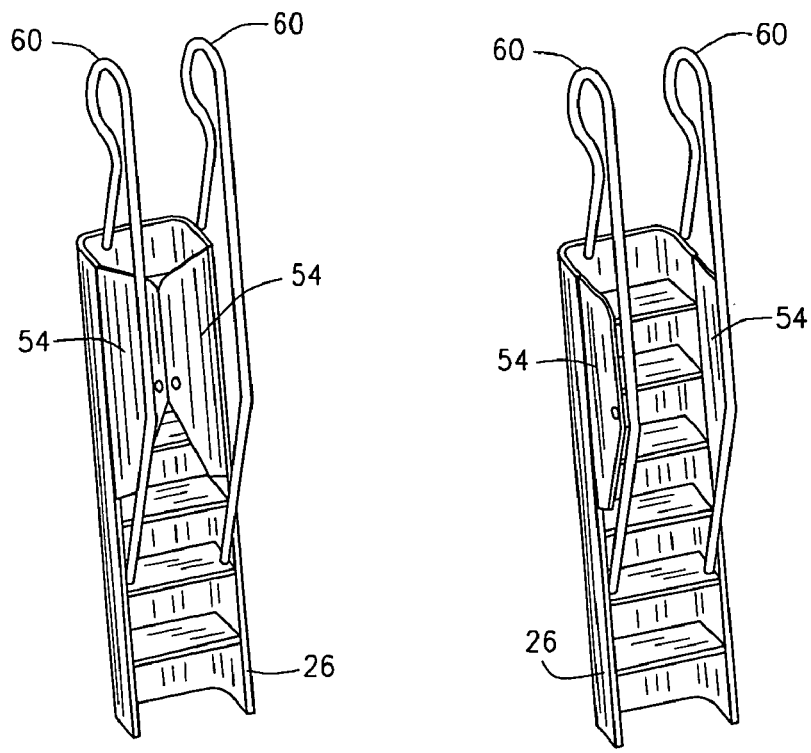
FIG. 6a illustrates a set of security doors included in a preferred embodiment of the access stairway shown in FIG. 1, in a deployed position.
FIG. 6b illustrates the set of security doors shown in FIG. 6a, in a stowed position.

FIGS. 6a and 6b illustrate a set of security doors included in a preferred embodiment of the access stairway 26 shown in FIG. 1. In a preferred embodiment, each access stairway 26 includes at least one security door 54. In a deployed position, shown in FIG. 6a, security doors 54 cover at least a portion of each access stairway 26 such that stairway 26 cannot be traversed. Security doors 54 can be locked in the deployed position and only unlocked by an authorized person, e.g. a crew member, of the mobile platform. Therefore, during periods when passengers are not allowed to access the privacy modules 14, such as during taxi, take-off and landing of an aircraft, the security doors 54 will be deployed and the access to the privacy modules 14 will be blocked. When the passengers are allowed to access the privacy modules 14 the security doors 54 will be placed in a non-deployed position, shown in FIG. 6b. In a preferred embodiment, when the security doors 54 are in the non-deployed position, the security doors 54 will be stowed within or under handrails 60 of each access stairway 26. Alternatively, the security doors 54 can be stowed in any suitable manner. That is, the security doors 54 will be stowed such they will not interfere with access to the access stairways 26 or become hazardous by moving during movement of the mobile platform 21. Thus, when the security doors 54 are in the non-deployed and stowed position, each access stairway 26 will be freely accessible and will allow an unhindered path to access each privacy module 14.

Figure 7:
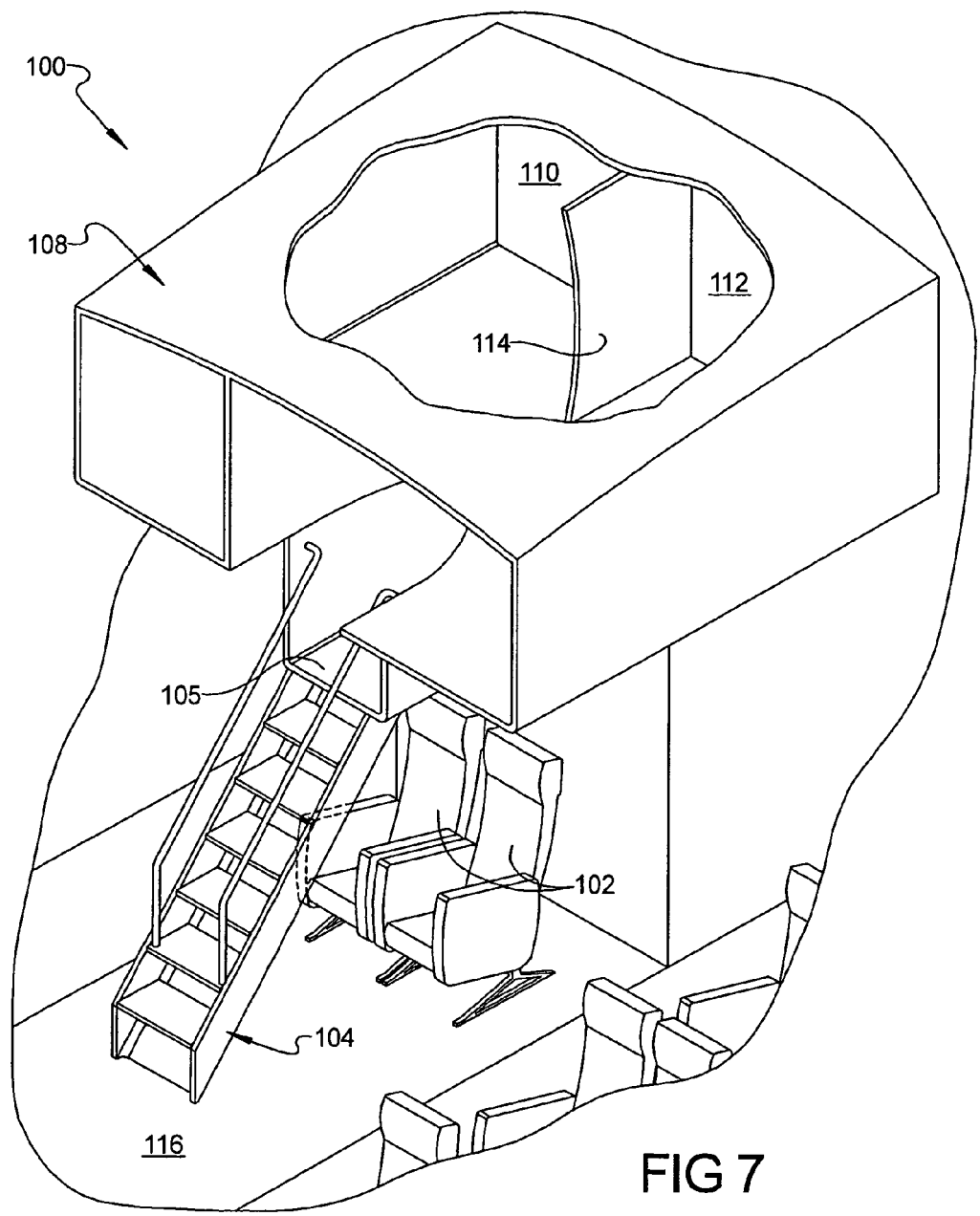
FIG. 7 is a perspective view of an overhead crew rest module in accordance with an alternative preferred embodiment of the present invention with wall portions of the module cut away to reveal the interior area.
Figure 9:
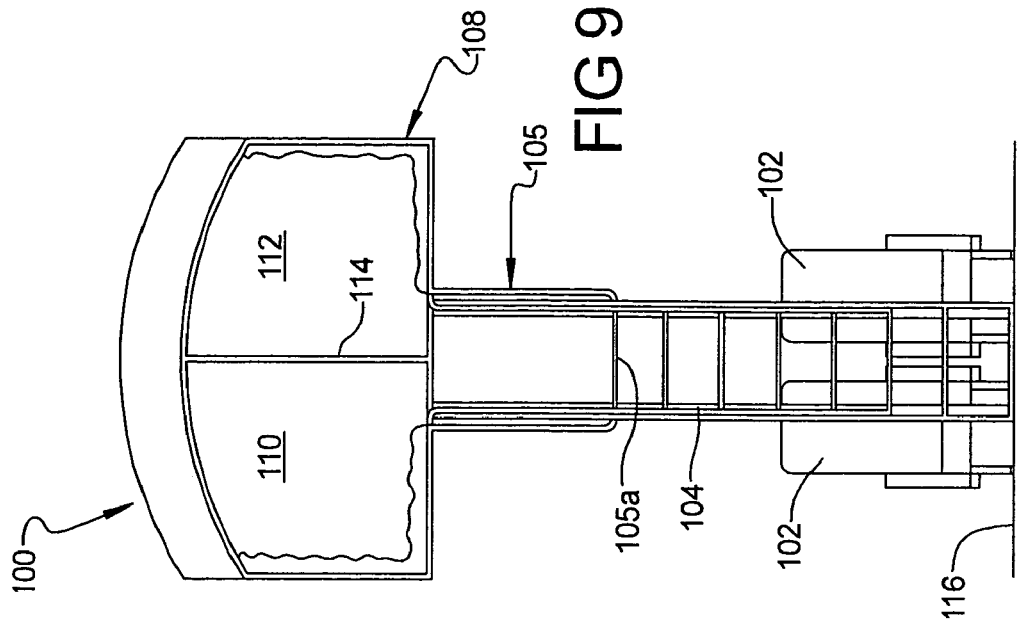
FIG. 9 is a front view of the module of FIG. 7 with wall portions of the overhead module cut away to better illustrate the interior area of the module.
Figure 8:
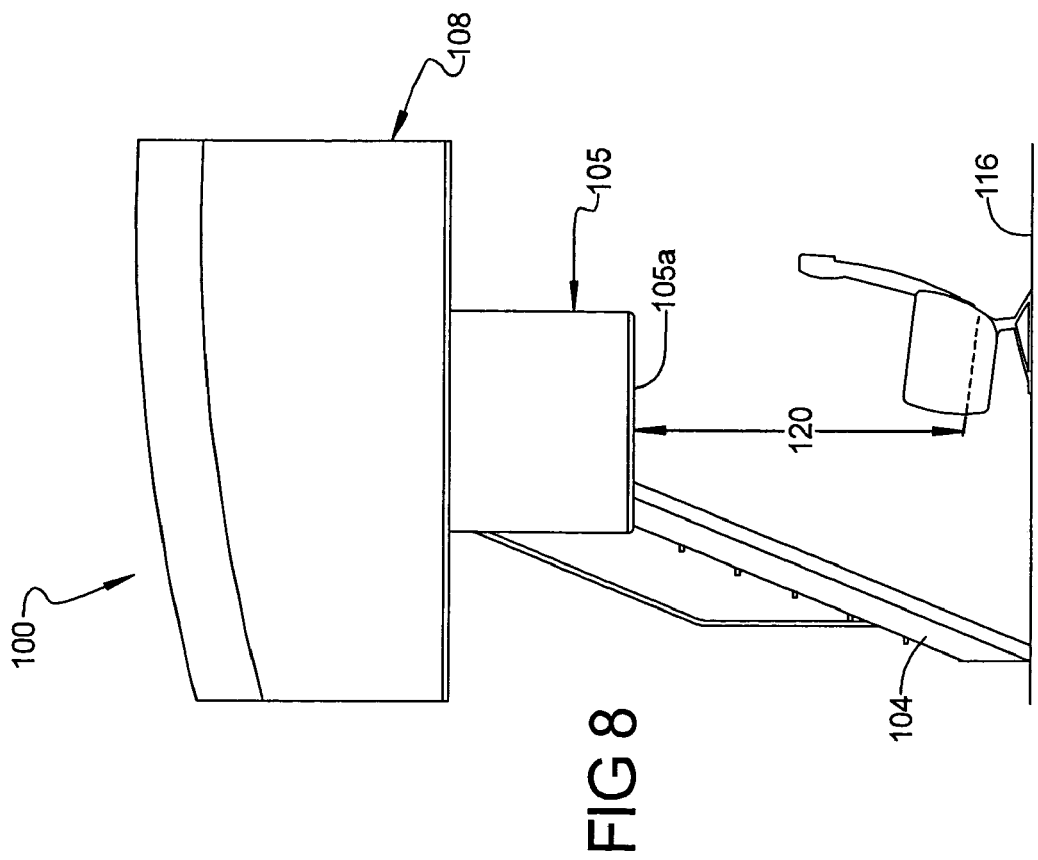
FIG. 8 is a side view of the module of FIG. 7.

Referring to FIGS. 7, 8 and 9, a crew rest privacy system 100 is illustrated that is especially well adapted for use in a crew member area of a mobile platform such as a commercial aircraft. System 100 could of course be used within designated crew operating areas of other forms of mobile platforms where it is desirable to provide a space efficient structure that allows crew members additional privacy and resting areas.

Such crew member areas could include, for example, an aft area of a commercial aircraft or a flight deck area of a commercial aircraft, or any other cabin area of a bus, train, ship, etc.

The privacy system 100 includes a pair of seats 102 adjacent a stairway 104. Stairway 104 leads to a platform 105 that an individual may stand on. The platform 105 lies underneath an aperture 106 that defines an opening into privacy module 108. Privacy module 108 defines a pair of berths 110 and 112 separated by a curtain 114 or fixed wall. Either berth 110 or 112 is accessible from the stairway 104.

If incorporated in a commercial aircraft, then specific regulations may need to be followed for the height provided in the berth area 108 and between the floor 116 and a lower surface 105a of platform 105. In one specific implementation as a privacy system 100, lower surface 105a is at least about 65 inches above the floor 116, while the berth area 108 has a height 118 of at least about 37 inches (93.98 cm). Preferably a clearance of at least about 43" (109.22 cm) is provided between a seat portion of seat 102 as indicated by arrow 120 (FIG. 8).

The modular overhead privacy system 10 includes a plurality of longitudinally spaced apart privacy modules 14 that provide passengers and/or crew members of a mobile platform a private space that is physically and psychologically associated with their seat 22. Each privacy module 14, 108 is independent and spaced apart from the other privacy modules, thereby isolating the berth(s) in each privacy module from the berth(s) in the other privacy modules. Additionally, each privacy module 14, 108 is accessible by an independent access stairway, thereby further isolating each privacy module from the other privacy modules. Therefore, the modular overhead privacy system 10, 100 provides passengers and/or crew members of the mobile platform with a high degree of privacy, independence and physical and psychological comfort.

Figure 10:
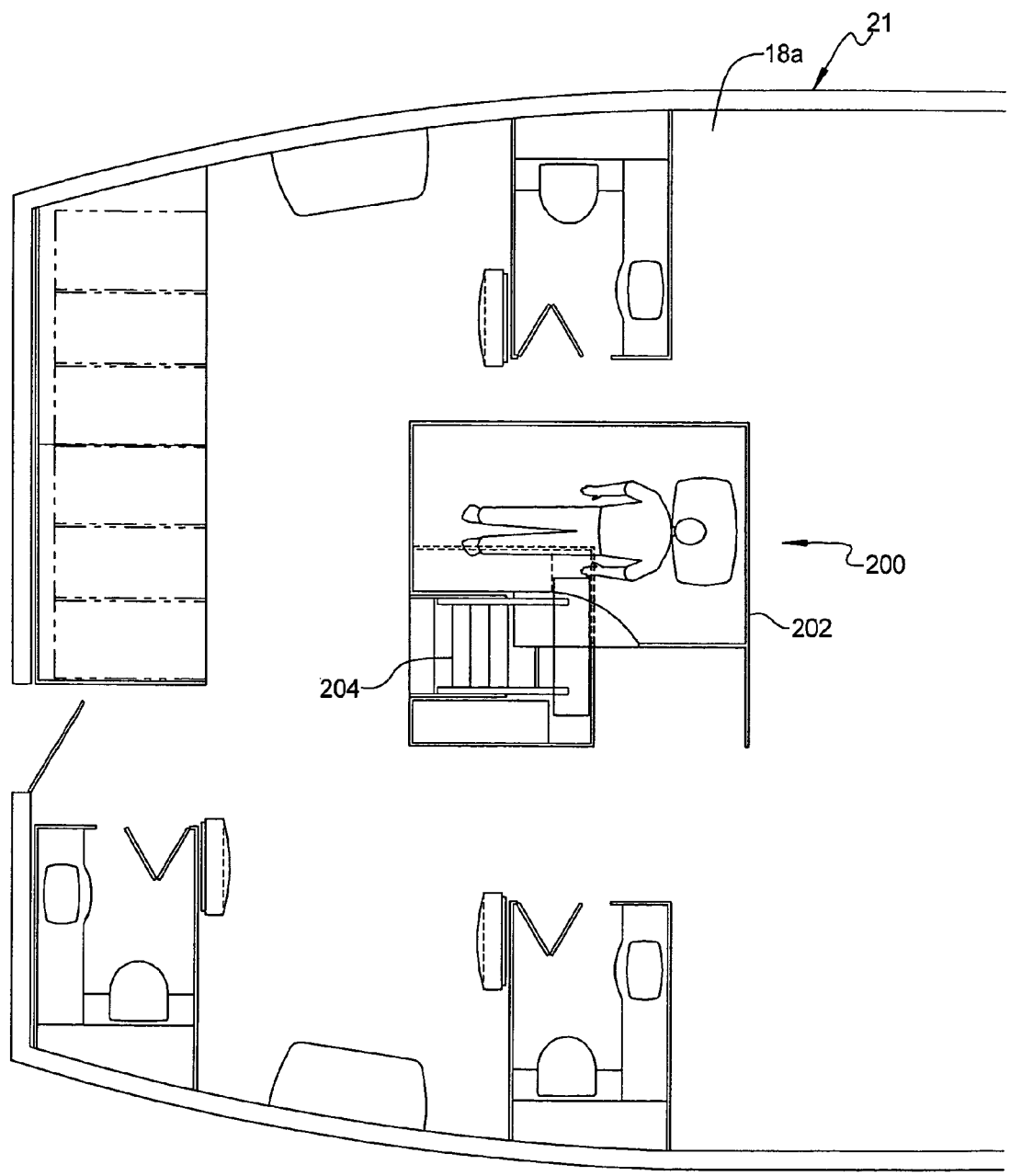
FIG. 10 is a plan view of an alternative preferred embodiment of the present invention.
Figure 11:
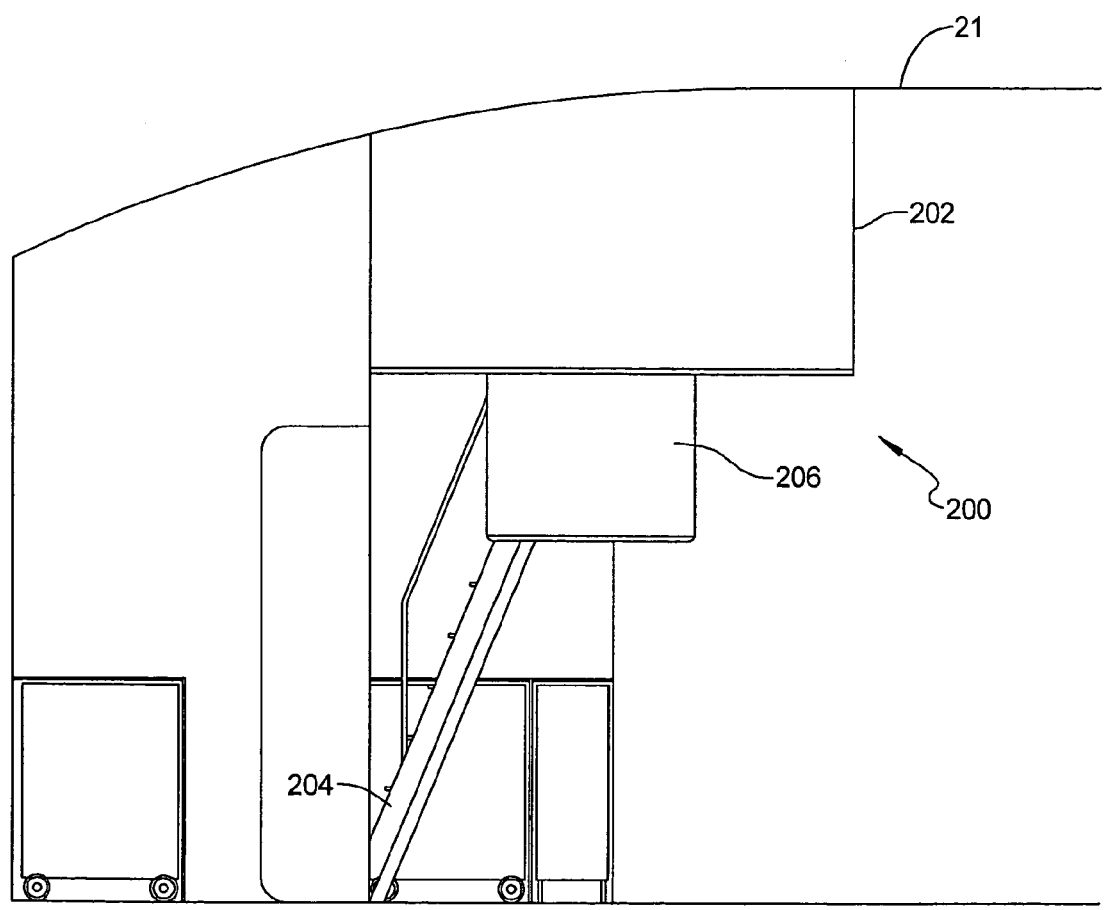
FIG. 11 is a side view of the embodiment of FIG. 10.

Referring to FIGS. 10 and 11, an overhead crew rest system 200 is shown in accordance with another alternative preferred embodiment of the present invention. System 200 is substantially similar to system 100 with the exception that it does not include floor mounted seats. This allows the area underneath the system 200 to be used for galley cart storage.

The system 200 includes an overhead crew rest module 202 and a stairway 204 leading to the ladder from the floor 18a. A landing 206 is positioned at a top of the stairway 204. The landing 206 allows an individual to stand thereon to more comfortably gain access to a single berth area formed inside the module 202. The area underneath the module 202, and the clearance between the floor 18a and the landing 206, are suitable to allow two or more galley carts 208 to be stored under the footprint of the module 202. In FIG. 10 the landing 206 is shown with an optional door 210 that can be closed to gain an additional degree of privacy. The system 200 can be located at any point within the cabin area of the mobile platform 21 but is especially well suited for placement at a forward area of the platform 21, if the platform is a commercial aircraft.

While the invention has been described in terms of various specific embodiments, those skilled in the art will recognize that the invention can be practiced with modification within the spirit and scope of the claims.

What is claimed is:

1. A method for providing individuals of a mobile platform private retiring quarters, said method comprising:

forming a plurality of independent privacy modules located longitudinally spaced apart, above a passenger cabin, in an overhead crown area of the mobile platform;

forming each said independent privacy module to include at least one private berth in which an individual can privately repose away from the passenger cabin;

forming a separate independent access from the passenger cabin to each said independent privacy module via a plurality of independent access stairways, each access stairway providing access to an independent one of the privacy modules via an aperture in a floor platform of the respective privacy module;

forming at least emergency gateway within each said privacy module to allow an individual residing in any given one of the privacy modules to exit said given one of the privacy modules and enter a longitudinally adjacent one of said privacy modules without entering said passenger cabin; and physically associating each said independent privacy module with at least one specific seat in the passenger cabin.

2. The method of claim 1, wherein forming a separate independent access from the passenger cabin to each privacy module comprises connecting each said independent privacy module to the passenger cabin via one of a plurality of access stairways such that each said privacy module is accessible by an independent one of the access stairways.

3. The method of claim 2, wherein connecting each said independent privacy module to the passenger cabin via one of a plurality of access stairways comprises connecting each said independent privacy module to the passenger cabin via one of a plurality of access stairways such that a single seating location within the passenger cabin that is otherwise occupied by a passenger seat is consumed by each said privacy module.

4. The method of claim 2, wherein forming a plurality of independent privacy modules located longitudinally spaced apart, above a passenger cabin, in an overhead crown area of the mobile platform comprises longitudinally spacing the privacy modules in accordance with a seat pitch of a plurality of rows of seats in the passenger cabin such that each said access stairway descends from The respective privacy module so that a bottom portion of the access stairway is associated with a specific row of seats and an upper portion of the access stairway provides sufficient access to a row of seats behind the row of seats associated with the bottom portion of the access stairway.

5. The method of claim 2, wherein associating each said independent privacy module with at least one specific seat in the passenger cabin comprises physically associating each said independent privacy module with at least one specific seat in the passenger cabin located near a bottom portion of the respective access stairway.

6. The method of claim 1, wherein the floor platform within each privacy module is adapted to allow an individual to comfortably move within the related privacy module 7. The method of claim 1, wherein forming a separate independent access from the passenger cabin to each privacy module comprises forming access to each access stairway from a lateral direction using at least one step included in a bottom portion of each access stairway that faces a direction orthogonal to a longitudinal centerline of the passenger cabin.

8. A method for providing individuals of a mobile platform private retiring quarters, said method comprising:

forming a plurality of independent privacy modules located longitudinally spaced apart, above a passenger cabin, in an overhead crown area of the mobile platform;

forming a separate independent access from the passenger cabin to each said independent privacy module via a plurality of independent access stairways, each said access stairway providing access to only an associated one of the privacy modules;

further forming at least one emergency gateway within each said privacy module to allow individuals within the privacy modules to exit each said privacy module and enter a longitudinally adjacent privacy module; and arranging each said stairway such that a lower end portion thereof is disposed between a pair of chairs in a seating row of said passenger cabin.

9. The method of claim 8, wherein forming a plurality of independent privacy modules comprises forming at least one private berth within each said privacy module in which an individual can privately repose.

10. The method of claim 8, wherein forming a plurality of independent privacy modules located longitudinally spaced apart, above a passenger cabin, in an overhead crown area of the mobile platform comprises longitudinally spacing the privacy modules in accordance with a seat pitch of a plurality of rows of seats in the passenger cabin such that each said access stairway descends from the respective privacy module so that a bottom portion of the access stairway is associated with a specific row of seats and an upper portion of the access stairway provides sufficient access to an adjacent row of seats behind the row of seats associated with the bottom portion of the access stairway.

11. The method of claim 8, further comprising forming each said privacy module with a floor platform that is adapted to allow an individual to comfortably move within its associated privacy module.

12. The method of claim 11, further comprising forming each said privacy module with a pair of at least partially partitioned berths for two individuals to simultaneously repose with a degree of privacy.

13. The method of claim 12, wherein forming each said privacy module with a floor platform comprises forming a floor platform with an opening in communication with an upper portion of said stairway that enables an individual to access either of said berths.

14. The method of claim 8, wherein providing a separate independent access from the passenger cabin to each said privacy module comprises providing access to each access stairway from a lateral direction using at least one step included in a bottom portion of each said access stairway that faces a direction orthogonal to a longitudinal centerline of the passenger cabin.

* * * * *